(12) United States Patent
Chen et al.

(10) Patent No.: US 10,895,364 B2
(45) Date of Patent: Jan. 19, 2021

(54) ENERGY REDUCTION OPTICS

(71) Applicant: ABL IP Holding LLC, Atlanta, GA (US)

(72) Inventors: Jie Chen, Snellville, GA (US); Craig Eugene Marquardt, Social Circle, GA (US)

(73) Assignee: ABL IP Holding LLC, Atlanta, GA (US)

(*) Notice: Subject to any disclaimer, the term of this patent is extended or adjusted under 35 U.S.C. 154(b) by 0 days.

(21) Appl. No.: 16/679,906

(22) Filed: Nov. 11, 2019

(65) Prior Publication Data

US 2020/0149707 A1     May 14, 2020

Related U.S. Application Data

(60) Provisional application No. 62/760,687, filed on Nov. 13, 2018.

(51) Int. Cl.
| | |
|---|---|
| *F21V 21/00* | (2006.01) |
| *F21V 5/04* | (2006.01) |
| *G02B 6/42* | (2006.01) |
| *F21Y 115/10* | (2016.01) |
| *G02B 6/28* | (2006.01) |

(52) U.S. Cl.
CPC ............ *F21V 5/04* (2013.01); *G02B 6/425* (2013.01); *F21Y 2115/10* (2016.08); *G02B 6/2848* (2013.01)

(58) Field of Classification Search
CPC ....... F21V 5/04; G02B 6/0425; G02B 6/2848; F21Y 2115/10

USPC ............. 362/326, 311.02, 311.04, 244
See application file for complete search history.

(56) References Cited

U.S. PATENT DOCUMENTS

| | | | | |
|---|---|---|---|---|
| 7,857,497 | B2* | 12/2010 | Koike | F21V 29/89 |
| | | | | 362/545 |
| 9,939,125 | B2* | 4/2018 | Donato | F21V 17/06 |
| 2012/0307495 | A1* | 12/2012 | Shih | F21V 5/007 |
| | | | | 362/237 |
| 2013/0039054 | A1* | 2/2013 | Yang | F21V 3/04 |
| | | | | 362/234 |
| 2013/0042510 | A1* | 2/2013 | Nall | G09F 13/0404 |
| | | | | 40/541 |
| 2013/0322088 | A1* | 12/2013 | Huang | G02B 19/0014 |
| | | | | 362/311.02 |
| 2014/0192529 | A1* | 7/2014 | Wilcox | F21V 3/00 |
| | | | | 362/244 |

(Continued)

*Primary Examiner* — Laura K Tso
(74) *Attorney, Agent, or Firm* — Kilpatrick Townsend & Stockton LLP

(57) ABSTRACT

A light fixture for lighting a surface includes a housing, a plurality of light sources, and a molded optic through which light from the light sources is directed. The molded optic further includes a plurality of concave aspheric optical surfaces in a first side of the molded optic, each of the concave aspheric optical surfaces partially enclosing one or more of the plurality of light sources, wherein the aspheric concave optical surfaces receive light directly from the respective light sources, and a plurality of convex aspheric optical surfaces disposed respectively opposite the plurality of concave aspheric optical surfaces on a second side of the molded optic, opposite the first side. The light sources and the aspheric optical surfaces cooperate to direct light onto the surface in an illumination field that is generally rectangular.

20 Claims, 16 Drawing Sheets

(56) References Cited

U.S. PATENT DOCUMENTS

| | | | | |
|---|---|---|---|---|
| 2014/0268761 A1* | 9/2014 | Raleigh | .................. | F21V 5/007 |
| | | | | 362/244 |
| 2015/0262518 A1* | 9/2015 | Freeman | ................. | F21V 5/007 |
| | | | | 362/311.02 |
| 2015/0369459 A1* | 12/2015 | Huang | ...................... | F21S 4/10 |
| | | | | 362/311.02 |
| 2016/0047528 A1* | 2/2016 | Goldstein | ................. | F21V 5/08 |
| | | | | 362/311.02 |
| 2016/0116135 A1* | 4/2016 | Wilcox | .................. | F21V 5/008 |
| | | | | 362/308 |
| 2016/0131332 A1* | 5/2016 | Broughton | ............ | F21V 7/0091 |
| | | | | 362/297 |
| 2016/0146425 A1* | 5/2016 | Kinnune | ............ | B29D 11/0073 |
| | | | | 362/294 |
| 2019/0145608 A1* | 5/2019 | Gorman | ................. | G09F 13/22 |
| | | | | 362/311.02 |

* cited by examiner

Ray Mapping Method in Freeform Optics

Step1: Create corner enhanced distribution on the target plane $I_t(u,v)$--Target.ies Convert E(x,y) on the target plane to $I_t(u,v)$ Step2: Create LED source distribution $I_s(u,v)$ --LED.ies Step3: Ray mapping $I_i(u,v)$ to $I_s(u,v)$, calculate the relationship $(\alpha,\beta)$.
Step4: $P_0(u_i,v_i)$ is calculated to bend from $\alpha$ to $(\alpha+\beta)/2$, and inner freeform curve is built
step 5: $P_1(u_i,v_i)$ is calculated to bend from $(\alpha+\beta)/2$ to $\beta$, and outer freeform curve is built
Step 6: forming inner and outer freeform surfaces based on the freeform curves

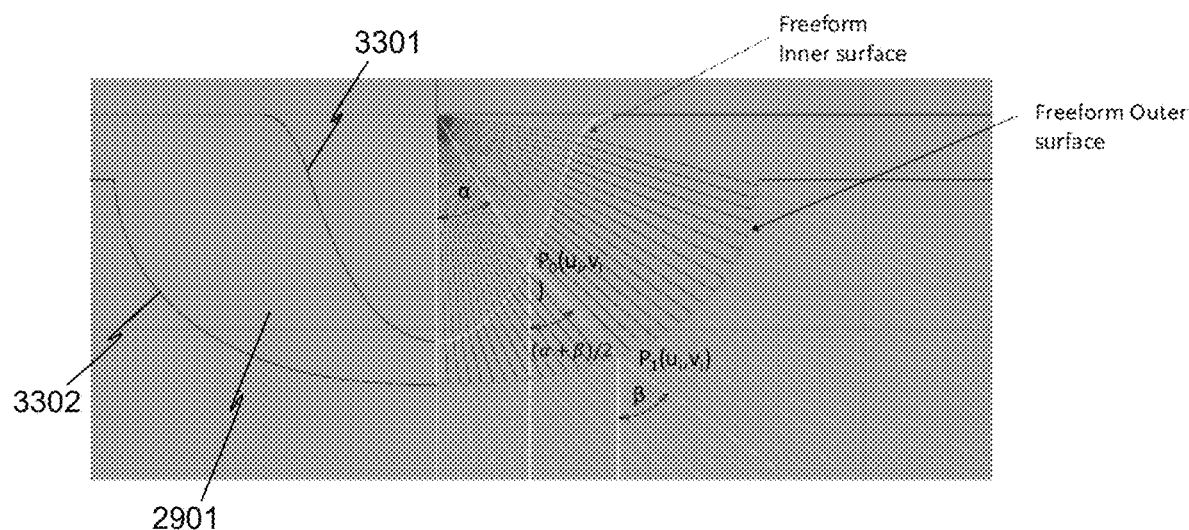

FIG. 33

ENERGY REDUCTION OPTICS

CROSS REFERENCE TO RELATED APPLICATIONS

This application claims the benefit of U.S. Provisional Patent Application No. 62/760,687, filed Nov. 13, 2018 and titled "Energy Reduction Optics", the entire disclosure of which is hereby incorporated by reference herein for all purposes.

BACKGROUND OF THE INVENTION

FIG. 1 illustrates a section of a typical large parking lot 100. A number of parking spaces 101 are laid out in rows with aisles 102 between them. Overhead lights 103 provide illumination to the parking lot, each projecting a pool 104 of light onto the surface of the parking lot 100. It is desirable that the parking lot 100 be uniformly lit to a level bright enough to provide safety and convenient location of vehicles at night.

The overhead lights 103 may be arranged in a rectangular grid determined by the typical size of the parking spaces 101 and the aisles 102. Typically the pools 104 of light are not perfectly rectangular, so interstitial darker areas 105 are created, which are not as brightly lit as other parts of the parking lot 100. (While pools 104 of light and interstitial areas 105 are shown as having sharp edges for ease of illustration, transitions between them may typically be more gradual than depicted.)

In order to light the interstitial areas to an acceptable level of brightness, and to provide an acceptable uniformity of illumination across the parking lot 100, lights such as the overhead lights 103 have historically been designed to provide more light than is necessary to light the pool 104 areas, so that the interstitial areas are brought up to an acceptable level of brightness, or have been designed so that the pools 104 of light are much larger than the light spacing, so that the pools 104 overlap into the interstitial areas 105. Either of these solutions requires more energy than if uniform light could be provided, and may still not result in pleasing light uniformity. In addition, enlarged pools 104 of light may be objectionable at the edges of the parking lot 100, as they may cast unwanted light onto adjoining properties.

BRIEF SUMMARY OF THE INVENTION

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings, and each claim.

According to one aspect, a light fixture for lighting a surface comprises a housing, a plurality of light sources, and a molded optic through which light from the light sources is directed. The molded optic further comprises a plurality of concave aspheric optical surfaces in a first side of the molded optic, each of the concave aspheric optical surfaces partially enclosing one or more of the plurality of light sources. The aspheric concave optical surfaces receive light directly from the respective light sources. The molded optic further comprises a plurality of convex aspheric optical surfaces disposed respectively opposite the plurality of concave aspheric optical surfaces on a second side of the molded optic, opposite the first side. The light sources, the concave aspheric optical surfaces, and the convex aspheric optical surfaces cooperate to direct light produced by the light sources onto the surface in an illumination field that is generally rectangular.

According to another aspect, a molded optic comprises a plurality of concave aspheric optical surfaces in a first side of the molded optic, and a plurality of convex aspheric optical surfaces disposed respectively opposite the plurality of concave aspheric optical surfaces on a second side of the molded optic, opposite the first side. The convex optical surfaces are at least partially briquette-shaped, having a rounded profile with extended rounded corners. Each of the concave aspheric optical surfaces cooperates with its respective convex aspheric optical surface to direct light produced by a light source at least partially enclosed by the concave aspheric optical surface onto a surface in an illumination field that is generally rectangular but has lobes of illumination at the corners extending beyond the boundaries of the otherwise-rectangular field shape.

BRIEF DESCRIPTION OF THE DRAWINGS

FIGS. 29-34 illustrate a technique for determining the shapes of the surfaces of an optic embodying the invention, including the concave and convex aspheric optical shapes.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 2:
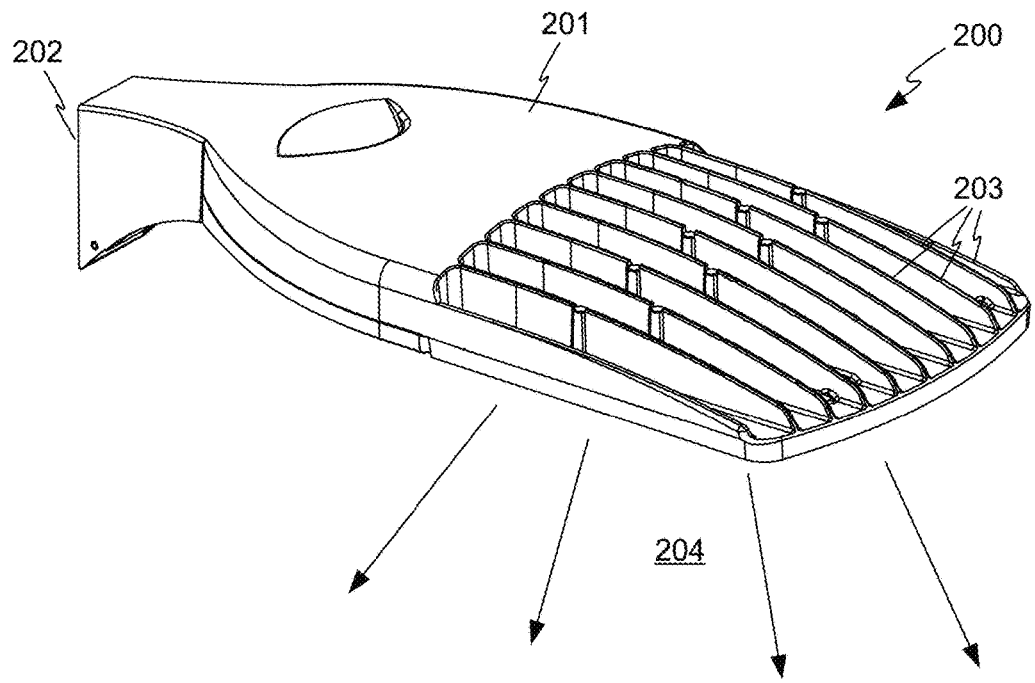
FIG. 2 shows an upper oblique view of a light fixture in accordance with embodiments of the invention.

FIG. 2 shows an upper oblique view of a light fixture 200 in accordance with embodiments of the invention. The light fixture 200 comprises a housing 201 having a mount 202 for mounting the light fixture 200 to a pole or other structure. The housing may include cooling ribs 203, serving as a heat sink for driver electronics (not shown) within the housing 201. The light fixture 200 may also receive electrical power through the mount 202. The light fixture 200 produces light 204, typically directed downward toward a surface such as a parking lot, but it will be recognized that the invention may be embodied in light fixtures oriented in any direction. Terms such as "upward," "downward," "top," "bottom," and the like in this disclosure refer to the orientation of FIG. 2, but are not intended to limit the usage of the light fixture to this orientation.

Figure 3:
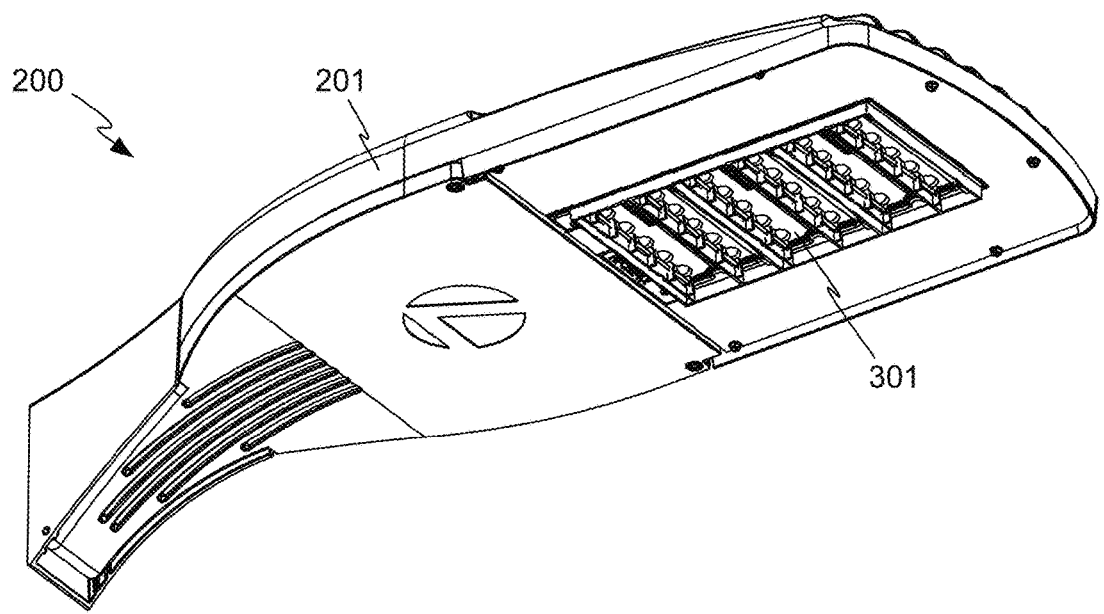
FIG. 3 shows a lower oblique view of the light fixture of FIG. 2.

FIG. 3 shows a lower oblique view of the light fixture 200. Visible in FIG. 3 is a light engine 301, which will be described in more detail below.

Figure 4:
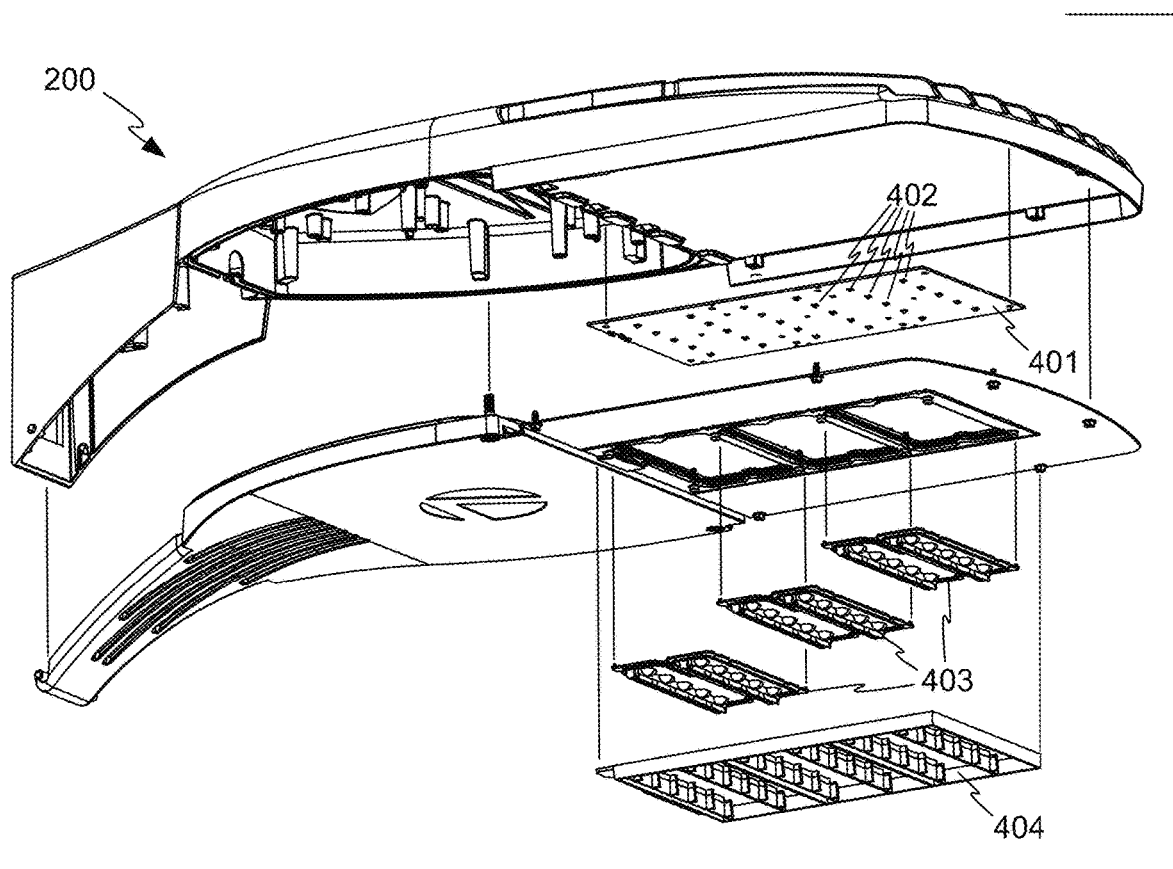
FIG. 4 shows a lower oblique exploded view of the light fixture of FIG. 2.

FIG. 4 shows a lower oblique exploded view of the light fixture 200. Driver electronics and wiring have been omitted from FIG. 4 for clarity of illustration, but it is to be understood that they are present as needed. A printed circuit board 401 holds a number of light emitting diodes (LEDs) 402. In this embodiment, 30 LEDs are shown, in six rows, but other embodiments may use more or fewer LEDs.

Three molded optics 403 are disposed below the LEDs 402. The molded optics 403 may be made, for example, of polycarbonate, acrylic, glass, or another substantially transparent optical material, and include optical elements for redirecting the light from the LEDs 402 into desired distributions. A mounting frame 404 holds the molded optics 403 in position under the LEDs 402. In other embodiments, the features of the molded optics 403 may be combined into a single optic, or may be divided into any workable number of separate optics.

The molded optics 403 are preferably configured to particular intended uses of the light fixture 200. For example, if the light fixture 200 is intended to be used in the middle portion of a large parking lot, then the molded optics may be configured to direct light downward in a symmetrical pattern. However, if the light fixture will be used at the edge of a parking lot, or as a street light, then the molded optics may be configured to direct the light in an asymmetric pattern.

Figure 5:
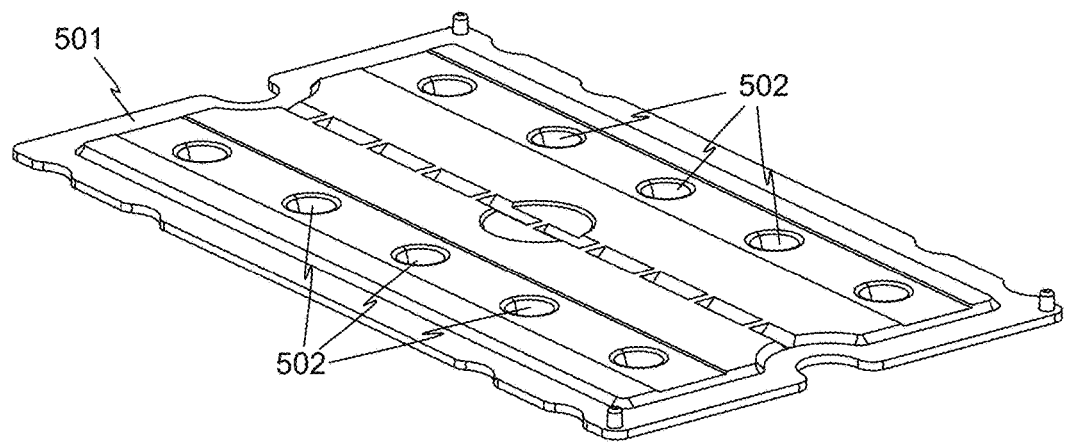
FIG. 5 shows an upper oblique view of a molded optic, in accordance with embodiments of the invention.

FIG. 5 shows an upper oblique view of a particular molded optic 501, in accordance with embodiments of the invention. Optic 501 includes a number of concave aspheric optical surfaces 502 formed into its top surface, and corresponding to two rows of LEDs 402 shown in FIG. 4. The concave aspheric optical surfaces 502 partially enclose their corresponding LEDs when the light fixture 200 is assembled. In this embodiment, the concave aspheric optical surfaces 502 are round in cross section, in keeping with the symmetric light distribution to be produced by the light fixture.

Figure 6:
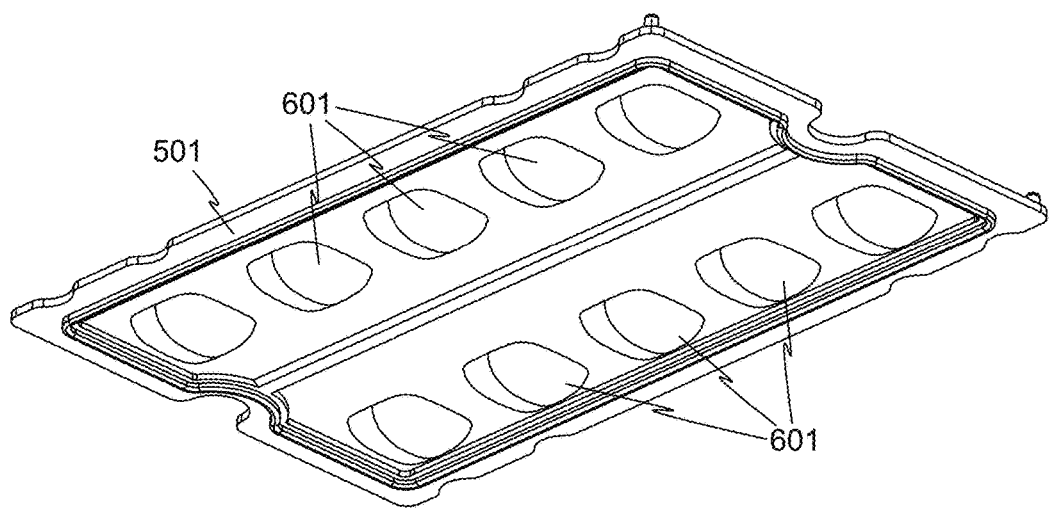
FIG. 6 shows a lower oblique view of the molded optic of FIG. 5.

FIG. 6 shows a lower oblique view of the molded optic 501. A number of convex aspheric optical surfaces 601 are formed in the lower surface of the optic 501. The convex aspheric optical surfaces 601 are briquette- or pillow-shaped, having a rounded profile with extended rounded corners.

Figure 7:
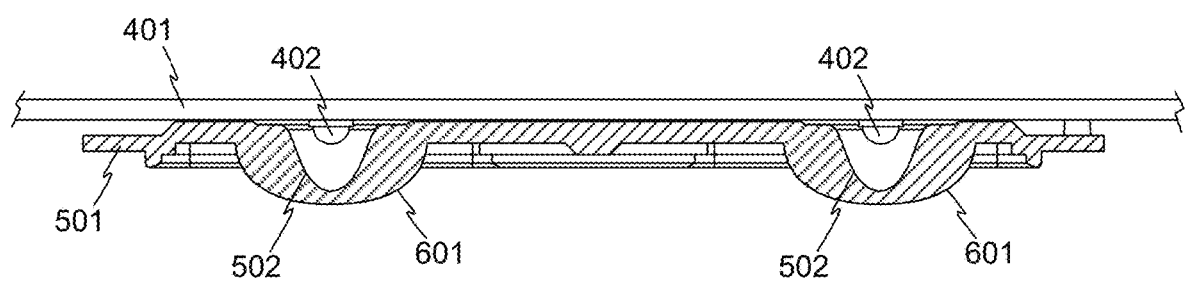
FIG. 7 shows a section view of the optic of FIG. 6 mounted adjacent to a printed circuit board.

FIG. 7 shows a section view of the optic 501 mounted adjacent to the printed circuit board 401. Two LEDs 402 are shown partially enclosed by two of the concave aspheric optical surfaces 502 of the optic 501. In turn, the convex aspheric optical surfaces 601 are disposed opposite the concave aspheric optical surfaces 502, on the opposite side of the optic 501. The region between the concave and convex aspheric optical surfaces 502 and 601 is completely filled with the material of the optic 501. Preferably, the optic 501 is a monolithic piece of optical material.

The LEDs and the concave and convex aspheric optical surfaces cooperate to create a desired illumination pattern. In the case of the molded optic 501, the illumination pattern is approximately square, so that adjacent light fixtures can light an extended surface without undue darkening at the locations where the illumination patterns of the light fixtures meet.

Figure 8:
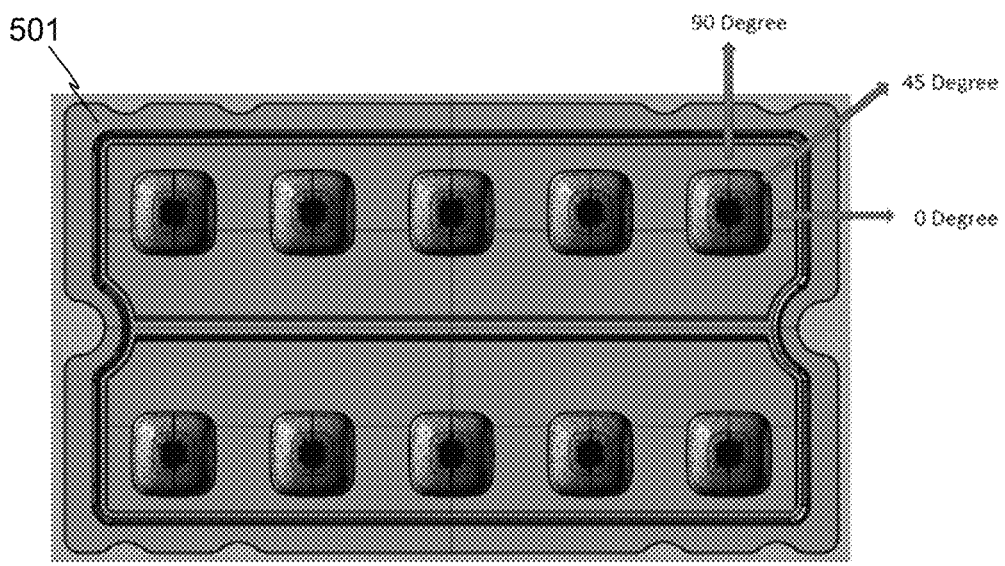
FIG. 8 illustrates a coordinate system for describing and modeling the performance of the optic of FIG. 5.

FIG. 8 illustrates a coordinate system for describing and modeling the performance of the optic 501.

Figure 9:
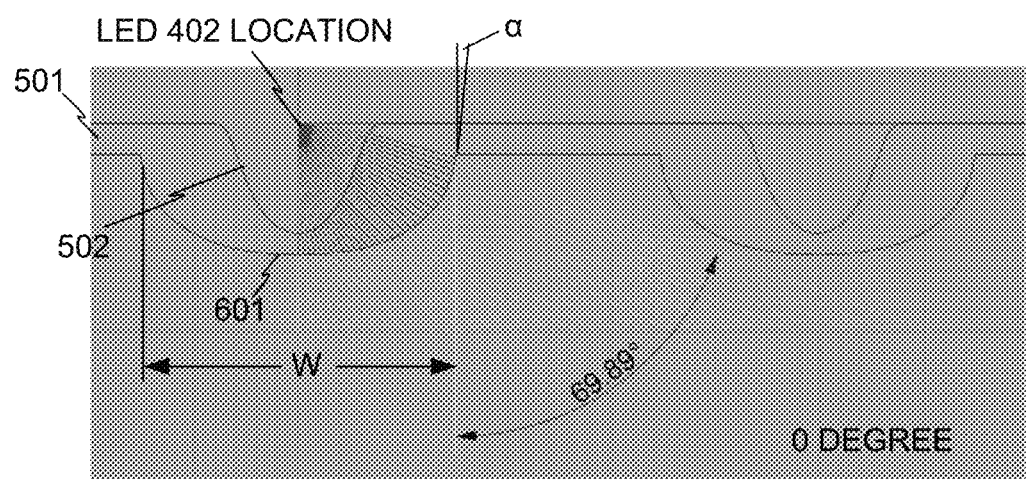
FIG. 9 shows a ray trace of light from one LED in the arrangement of FIG. 8, in one direction.

FIG. 9 shows a ray trace of light from one of the LEDs in the "0 degree" direction indicated in FIG. 8. Light from the LED encounters the concave aspheric optical surface 502 and refracts into the optic 501. The light travels through the optic 501 and refracts out at the convex aspheric optical surface 601. Because of the geometry of the system, including the position of the LED 402 and the shapes of the surfaces, the uppermost rays from the LED refract out of the optic 501 at an angle of slightly less than 70 degrees from vertical.

Figure 10:
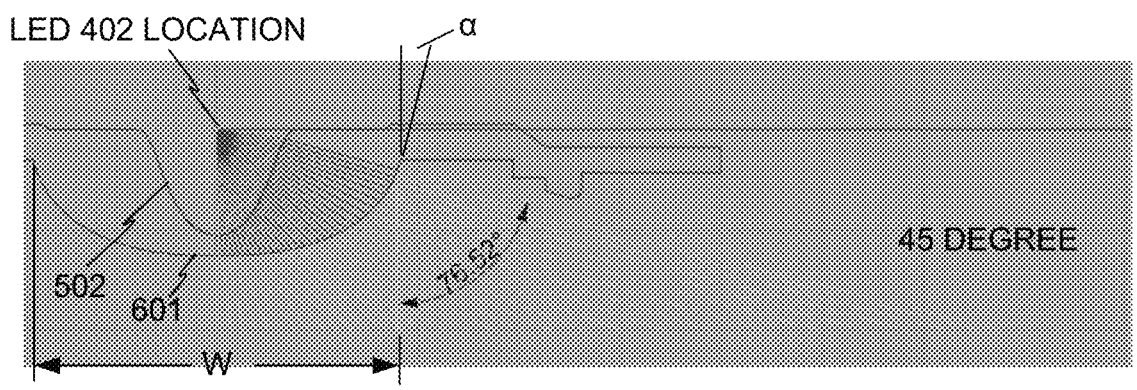
FIG. 10 shows a ray trace of light from one LED in the arrangement of FIG. 8, in another direction.

FIG. 10 shows a ray trace of light from one of the LEDs in the "45 degree" direction indicated in FIG. 8. Light from the LED encounters the concave aspheric optical surface 502 and refracts into the optic 501, travels through the optic 501, and refracts out at the convex aspheric optical surface 601. Because of the geometry of the system, including the position of the LED 402 and the shapes of the surfaces, the uppermost rays from the LED refract out of the optic 501 at an angle of slightly more than 76 degrees from vertical. In particular, the effective width W of the convex aspheric optical surface 602 is wider in the 45 degree direction, and the convex aspheric optical surface 602 meets the lower face of the optic 501 at a slightly shallower angle α.

Figure 11:
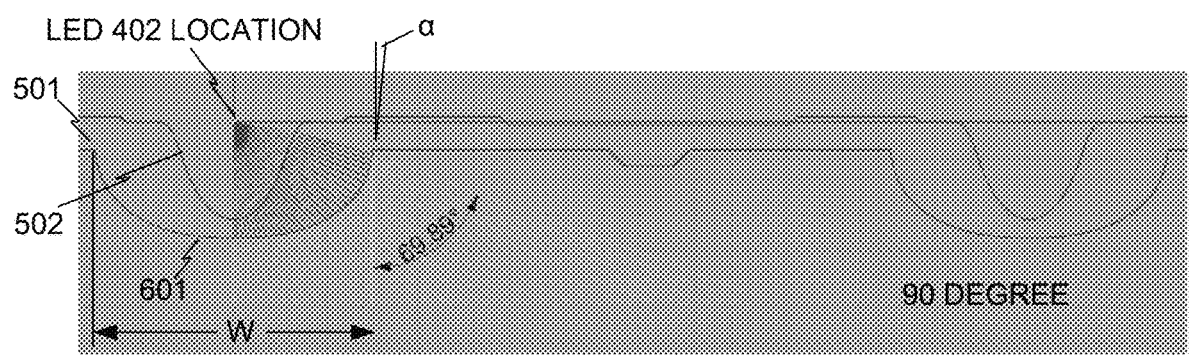
FIG. 11 shows a ray trace of light from one LED in the arrangement of FIG. 8, in another direction.

FIG. 11 shows a ray trace of light from one of the LEDs in the "90 degree" direction indicated in FIG. 8. Because the concave and convex aspheric optical surfaces 502 and 601 have 90-degree rotational symmetry, the ray trace for the 90 degree direction is identical to the ray trace for the 0 degree direction.

Figure 12:
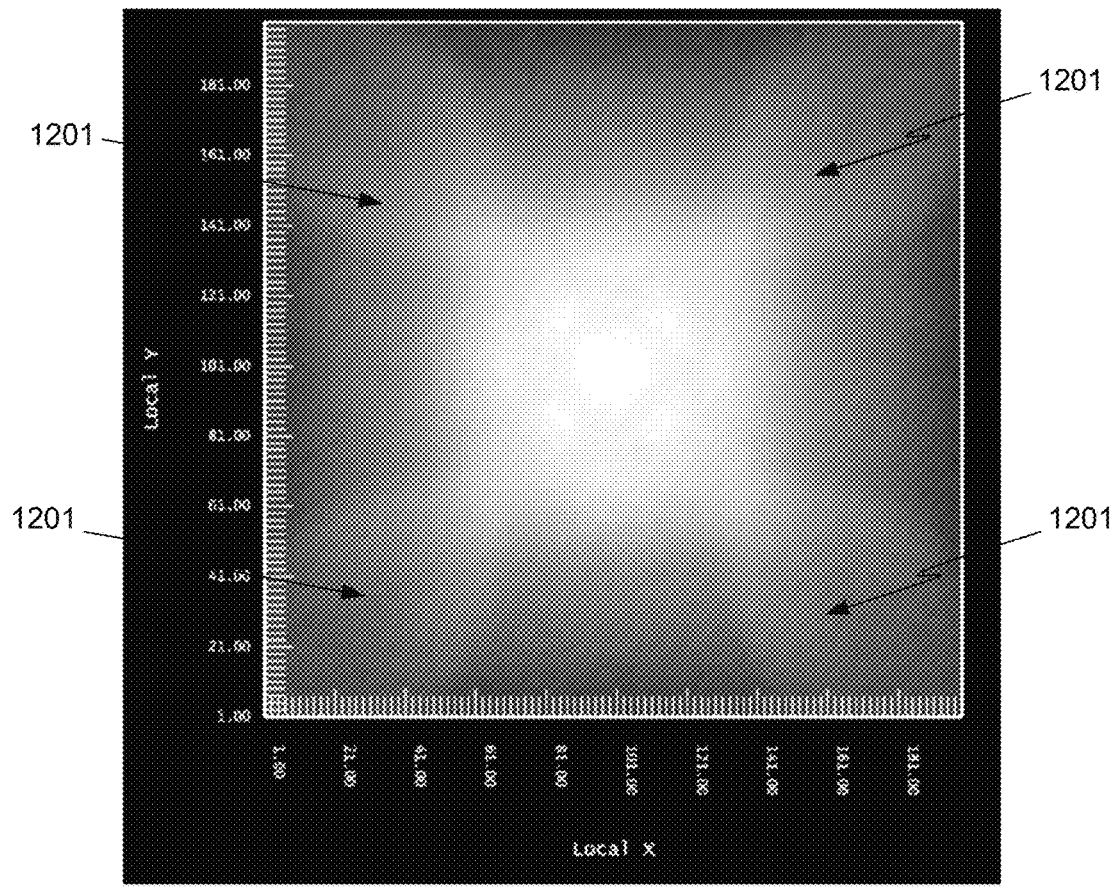
FIG. 12 shows the results of a ray trace simulation of the brightness of illumination produced by a light fixture in accordance with embodiments of the invention, using the optic of FIG. 5.

FIG. 12 shows the results of a ray trace simulation of the brightness of illumination produced by a light fixture in accordance with embodiments of the invention, using optic 501. As can be seen, the illumination field is generally square, but has lobes 1201 of illumination at the corners extending beyond the boundaries of the otherwise-square field shape.

Because light from each of the LEDs is directed into a light field that is substantially symmetrical about an optical axis of the respective LED, and because the light fixture is positioned a relatively large distance above the lit surface in relation to the size of the light fixture, the aggregate illumination projected onto the surface may also fall in a field that is substantially symmetrical, and is approximately the same size as the illumination field produced by each of the LEDs individually.

Figure 1:
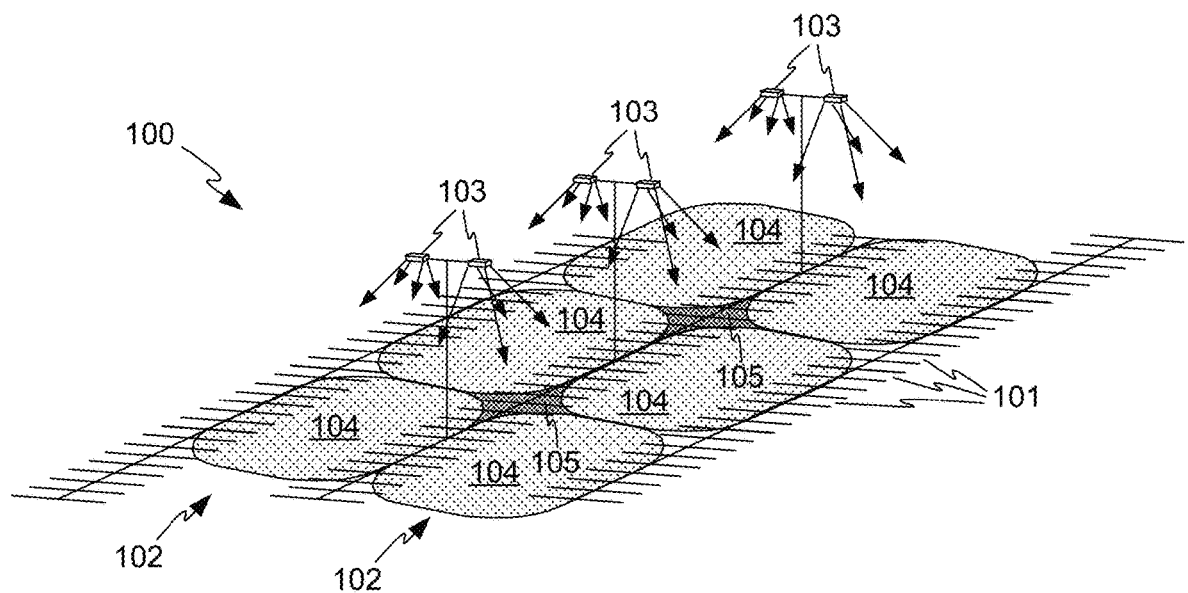
FIG. 1 illustrates a section of a typical large parking lot.
Figure 13:
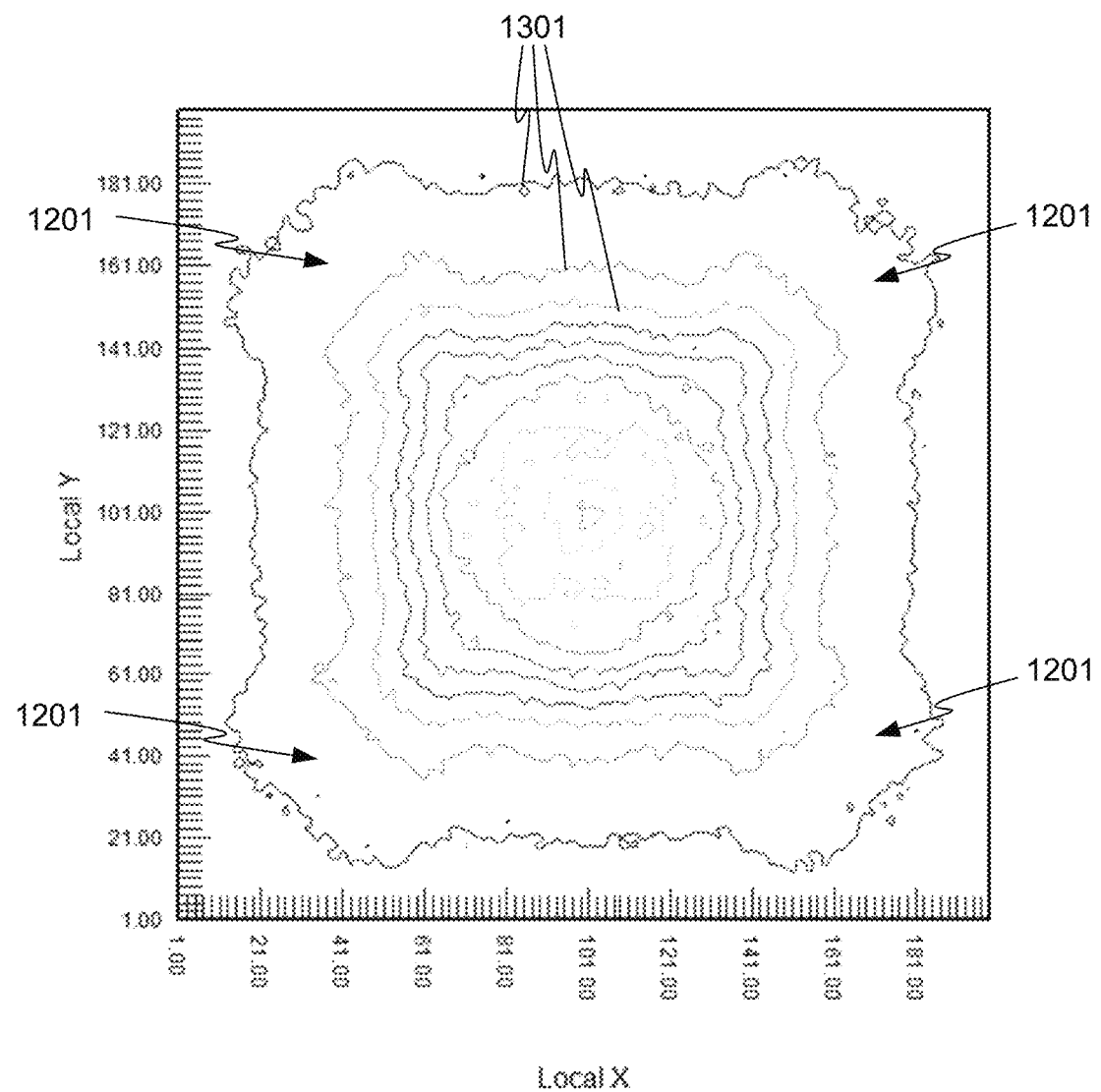
FIG. 13 shows loci of constant brightness in the data of FIG. 12.

FIG. 13 shows this effect numerically, showing concentric loci of constant brightness 1301. Lobes 1201 are visible in this representation as well. Adjacent light fixtures having the light distribution of FIGS. 12 and 13 tend to "fill in" interstitial areas such as relatively dark areas 105 shown in FIG. 1. This may result in more pleasingly uniform illumination in a parking lot or other space, and may result in significant energy savings, because the brighter parts of the parking lot do not need to be over-illuminated to bring up the illumination in the interstitial areas to acceptable levels, and the area illuminated by each light fixture need not be oversized, which could result in wasted light, especially at the edges of the lot.

Figure 14:
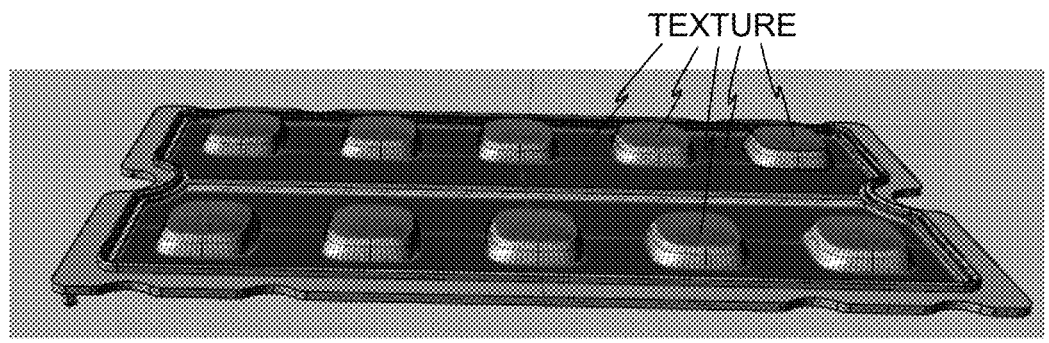
FIG. 14 shows the use of texture on some surfaces of the optic of FIG. 5, in accordance with embodiments of the invention.

In some embodiments, the performance of the light fixture may be enhanced by texturing certain surfaces of the optic 501, for example as shown in FIG. 14. In FIG. 14, texture is applied to the flat areas of the optic 501 between the convex aspheric optical surfaces 601, and also on the dome-shaped "tops" of the convex aspheric optical surfaces 601 (which may face downward in a parking lot illumination application).

Figure 15:
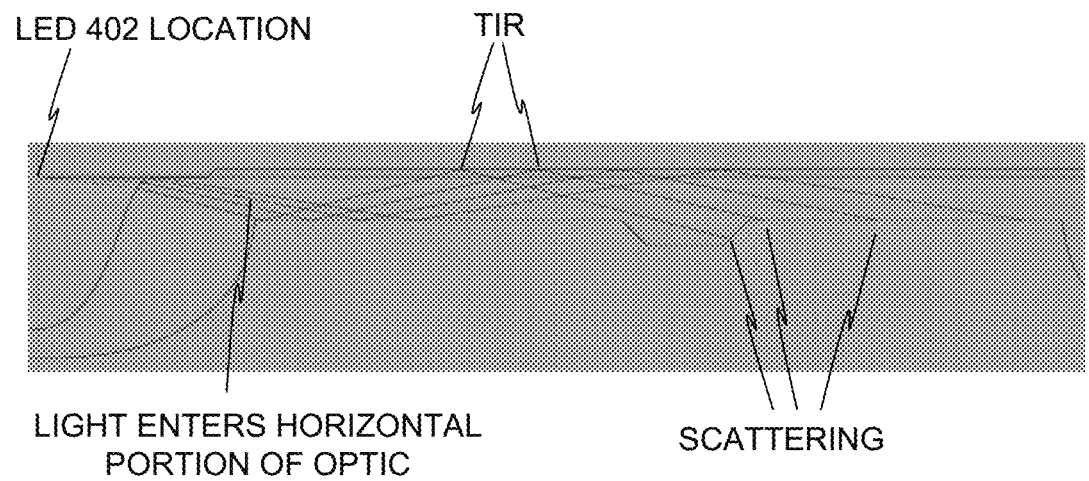
FIG. 15 shows the effect of texture on some surfaces of the optic of FIG. 5, in accordance with embodiments of the invention.

FIG. 15 illustrates the purpose of the texturing of the lower flat surfaces of the optic. Some light that enters the optic 501 from the LED 402 may not refract out of the convex aspheric optical surfaces 601, but instead may enter the flat horizontal portion of the optic 501. The top surface of the optic 501 is preferably smooth enough, for example polished or formed by a polished mold, so that light entering the edge of the optic reflects from the top surface by total internal reflection (TIR). However, when the light encounters the textured lower surface, it can scatter at least partially downward, adding to the illumination level of the surface below.

Figure 16:
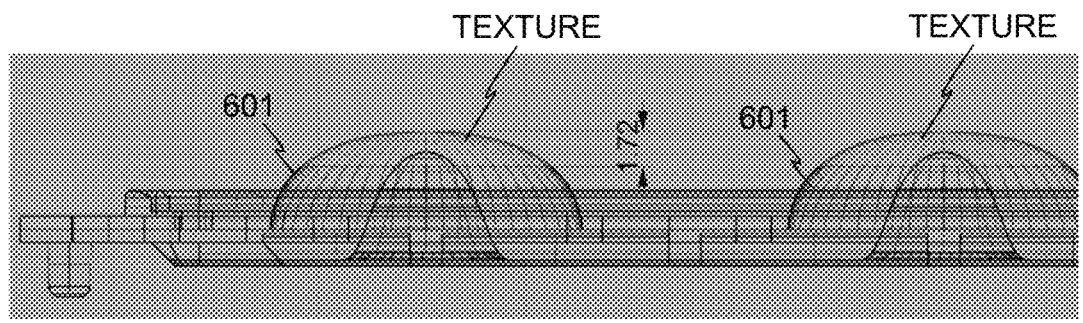
FIG. 16 shows the use of texture on some surfaces of the optic of FIG. 5, in accordance with embodiments of the invention.

FIG. 16 illustrates the area of the convex aspheric optical surfaces 601 that may be textured in one embodiment.

A light fixture using an optic such as the optic 501 may be termed a "Type 5" light fixture, in accordance with terminology used by the Illuminating Engineering Society of North America (IESNA). Type 5 light fixtures produce light in a symmetrical pattern about a center point below the fixture.

Figure 17:
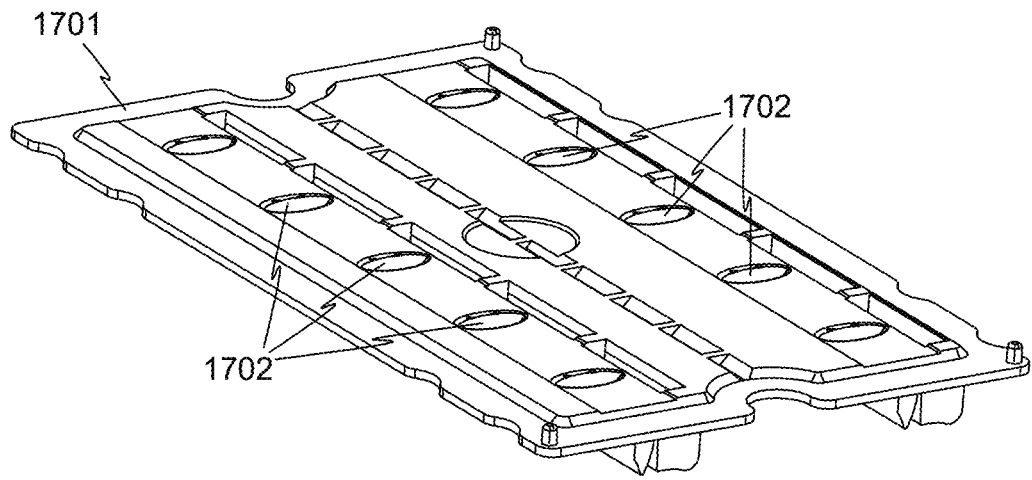
FIG. 17 shows an upper oblique view of a molded optic in accordance with embodiments of the invention.

In accordance with other embodiments of the invention, light fixtures of other IESNA types may be produced. For example, FIG. 17 shows an upper oblique view of a molded optic 1701 that may be used in a "Type 3" fixture, which produces an asymmetrical light field. Optic 1701 also includes a number of concave aspheric optical surfaces 1702 formed into its upper surface, and corresponding to two rows of LEDs 402 shown in FIG. 4. The concave aspheric optical surfaces 1702 partially enclose their corresponding LEDs when the light fixture is assembled. In this embodiment, the concave aspheric optical surfaces 1702 are oblong in cross section, in keeping with the asymmetric light distribution to be produced by the light fixture.

Figure 18:
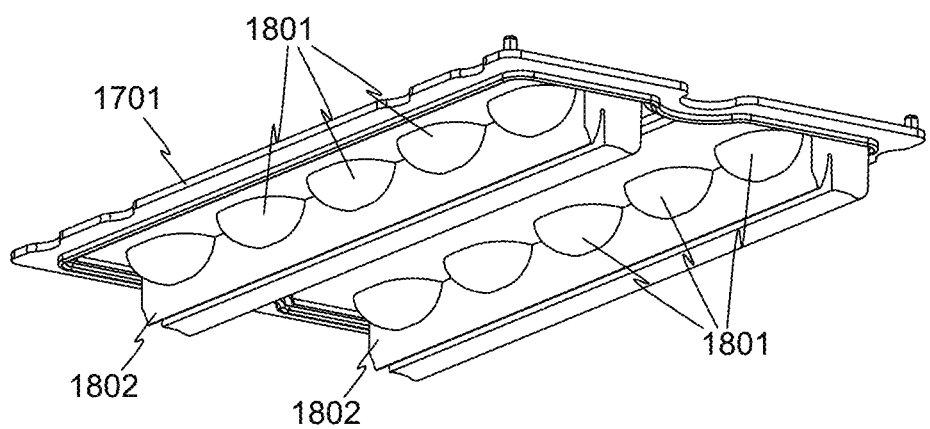
FIG. 18 shows a lower oblique view of the molded optic of FIG. 17.

FIG. 18 shows a lower oblique view of the molded optic 1701. A number of convex aspheric optical surfaces 1801 are formed in the lower surface of the optic 1701. The convex aspheric optical surfaces 1801 are partially briquette- or pillow-shaped, having a rounded profile with extended rounded corners. In addition, an extended prismatic feature 1802 is provided along each row of convex aspheric optical surfaces 1801, the purpose of which is explained below.

Figure 19:
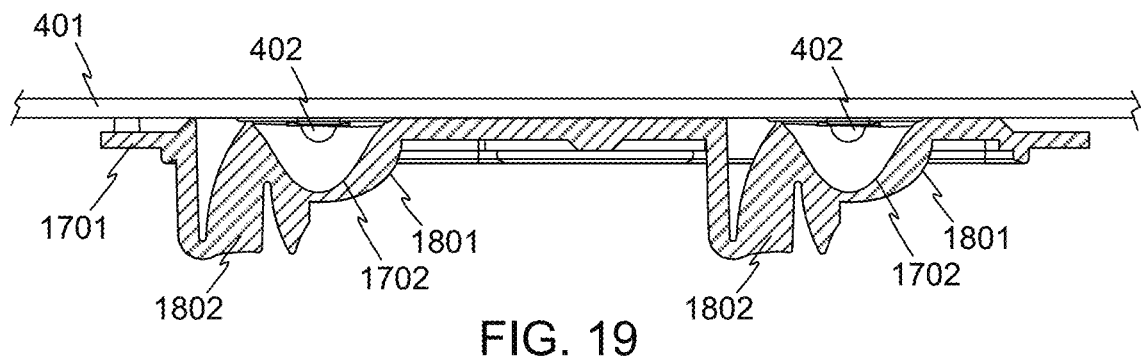
FIG. 19 shows a section view of the optic of FIG. 17 mounted adjacent to a printed circuit board.

FIG. 19 shows a section view of the optic 1701 mounted adjacent to the printed circuit board 401. Two LEDs 402 are shown partially enclosed by two of the concave aspheric optical surfaces 1702 of the optic 1701. In turn, the convex aspheric optical surfaces 1801 are disposed opposite the concave aspheric optical surfaces 1702, on the opposite side of the optic 1701. The region between the concave and convex aspheric optical surfaces 1702 and 1801 is completely filled with the material of the optic 1701. Preferably, the optic 1701 is a monolithic piece of optical material.

The LEDs and the concave and convex aspheric optical surfaces cooperate to create a desired illumination pattern. In the case of the molded optic 1701, the illumination pattern is approximately rectangular, so that adjacent light fixtures can light an extended surface without undue darkening at the locations where the illumination patterns of the light fixtures meet.

Figure 20:
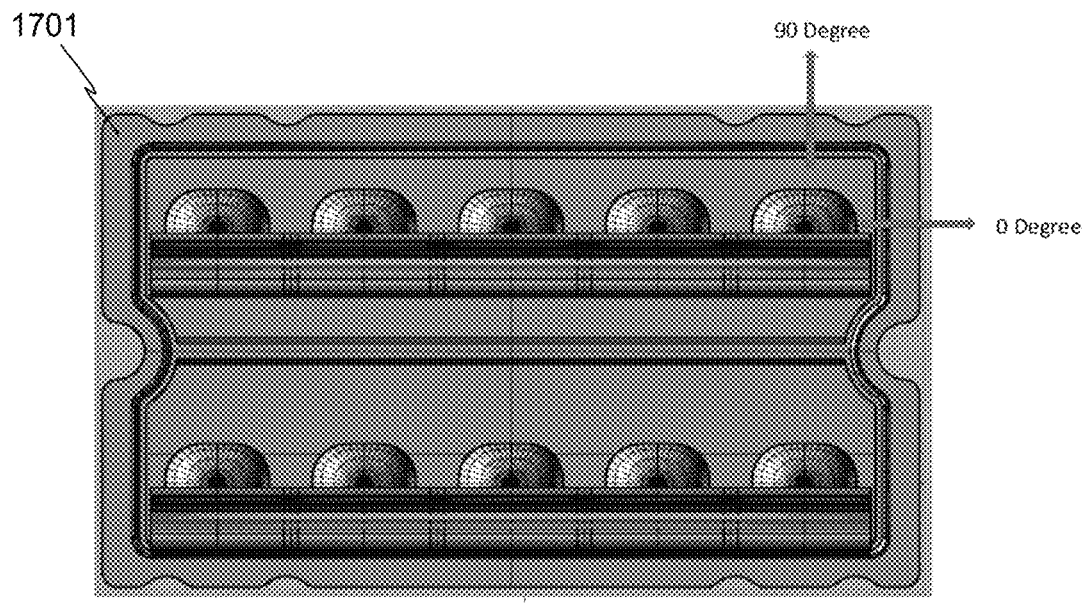
FIG. 20 illustrates a coordinate system for describing and modeling the performance of the optic of FIG. 17.

FIG. 20 illustrates a coordinate system for describing and modeling the performance of the optic 1701.

Figure 21:
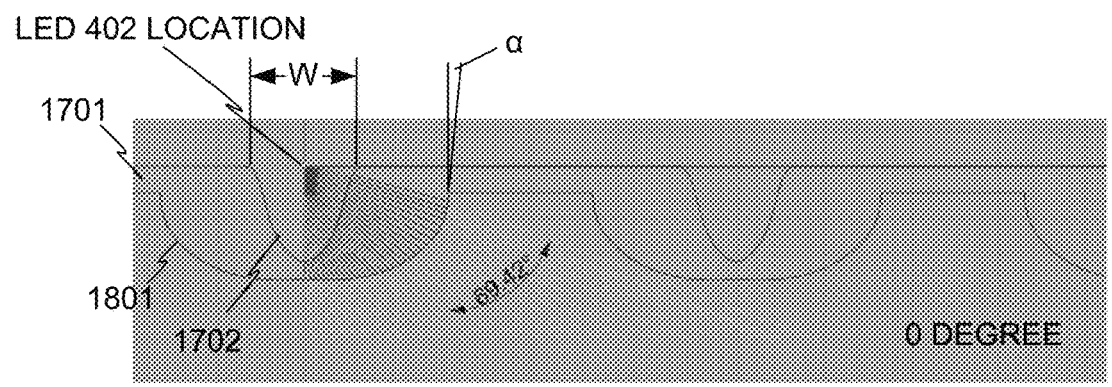
FIG. 21 shows a ray trace of light from one LED in the arrangement of FIG. 20, in one direction.

FIG. 21 shows a ray trace of light from one of the LEDs in the "0 degree" direction indicated in FIG. 20. Light from the LED encounters the concave aspheric optical surface 1702 and refracts into the optic 1701. The light travels through the optic 1701 and refracts out at the convex aspheric optical surface 1801. Because of the geometry of the system, including the position of the LED 402 and the shapes of the surfaces, the uppermost rays from the LED refract out of the optic 1701 at an angle of slightly less than 70 degrees from vertical.

Figure 22:
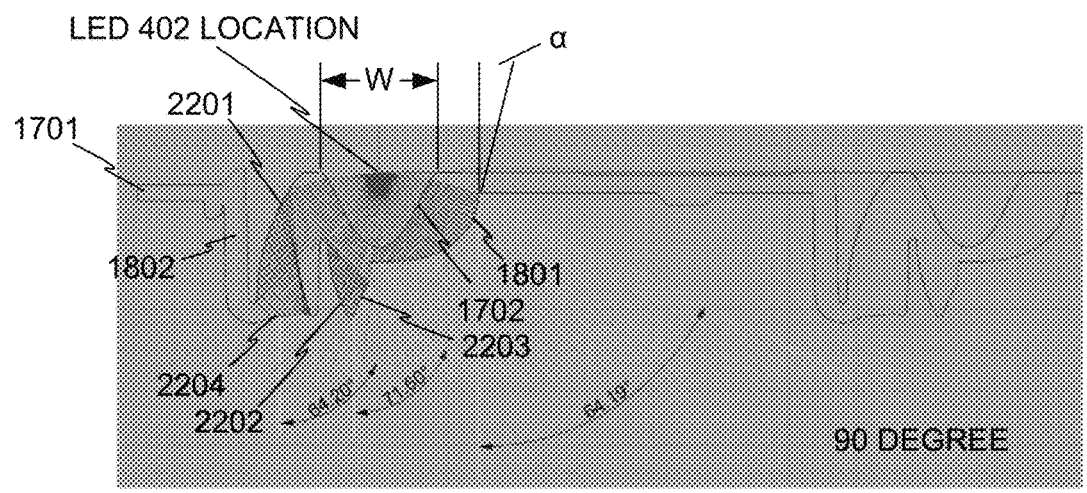
FIG. 22 shows a ray trace of light from one LED in the arrangement of FIG. 20, in another direction.

FIG. 22 shows a ray trace of light from one of the LEDs in the "90 degree" direction indicated in FIG. 20. As is visible in FIG. 22, the aspheric surfaces 1702 and 1801 and the prismatic feature 1802 cooperate to direct light from the LED 402 downward and to the right in the 90 degree direction. Light from the LED 402 that encounters aspheric surface 1702 and the aspheric surface 1801 is refracted in a manner similar to that shown in FIGS. 10 and 21. However, most of the light that encounters prismatic feature 1802 is reflected by total internal reflection (TIR) from curved surfaces 2201 and 2202, and is cast downward and to the right, after refracting through curved surfaces 2203 and 2204.

As is visible in FIGS. 21 and 22, the width W of the concave aspheric optical surfaces may be different in the 0-degree and 90-degree directions. Texturing may be applied to certain exit surfaces of the optic 1701, similar to that described above with regard to the optic 501.

Figure 23:
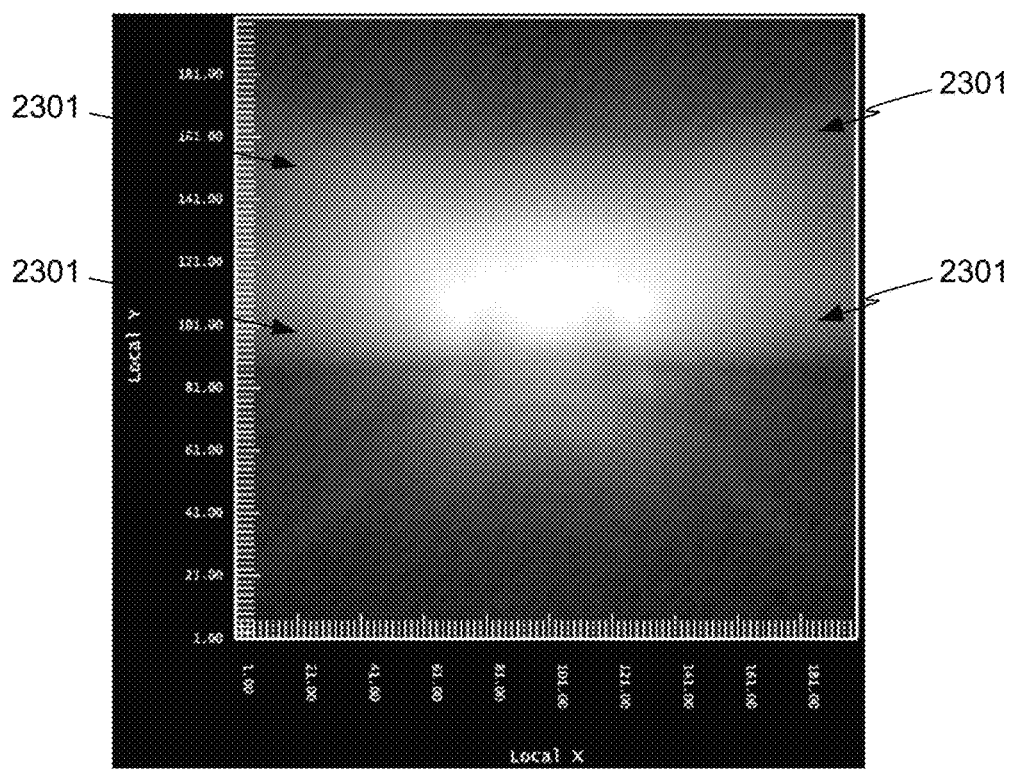
FIG. 23 shows the results of a ray trace simulation of the brightness of illumination produced by a light fixture in accordance with embodiments of the invention, using the optic of FIG. 17.

FIG. 23 shows the results of a ray trace simulation of the brightness of illumination produced by a light fixture in accordance with embodiments of the invention, using optic 1701. As can be seen, the illumination field is generally rectangular, and is directed asymmetrically to one side (upward in FIG. 23) of the LEDs. The combination of optical features has pushed light into the corners 2301 of the illumination field.

Because light from each of the LEDs is directed into a light field that is asymmetrical about an optical axis of the respective LED, and because the light fixture is positioned a relatively large distance above the lit surface in relation to the size of the light fixture, the aggregate illumination projected onto the surface may also fall in a field that is asymmetrical, and is approximately the same size and shape as the illumination field produced by each of the LEDs individually.

Figure 24:
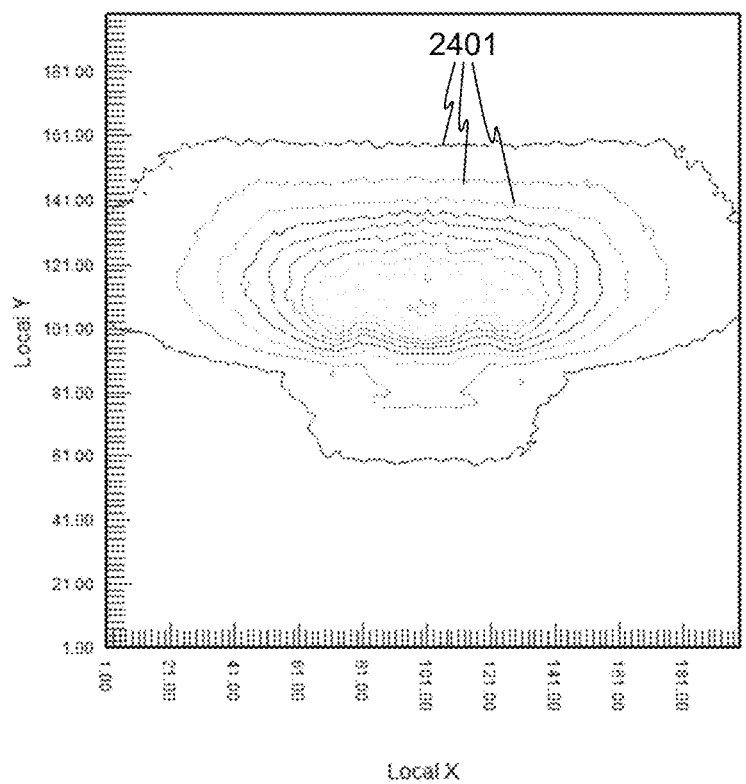
FIG. 24 shows loci of constant brightness in the data of FIG. 23.

FIG. 24 shows this effect numerically, showing concentric loci of constant brightness 2401. The generally-rectangular shape of the illumination field is visible in this representation as well. Adjacent light fixtures having the light distribution of FIGS. 23 and 24 tend to "fill in" interstitial areas such relatively dark areas 105 shown in FIG. 1. This may result in more pleasingly uniform illumination in a parking lot or other space, and may result in significant energy savings, because the brighter parts of the parking lot do not need to be over-illuminated to bring up the illumination in the interstitial areas to acceptable levels, and the area illuminated by each light fixture need not be oversized, which could result in wasted light, especially at the edges of the lot.

Figure 25:
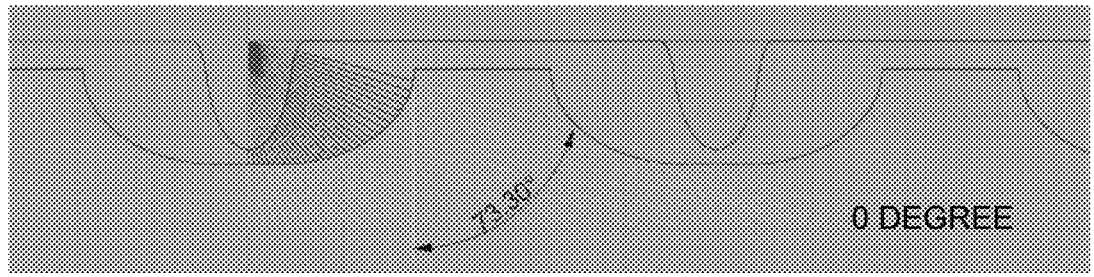
FIG. 25 and FIG. 26 show ray traces of light from one of the LEDs in two different directions in a Type 2 light fixture in accordance with embodiments of the invention.
Figure 26:
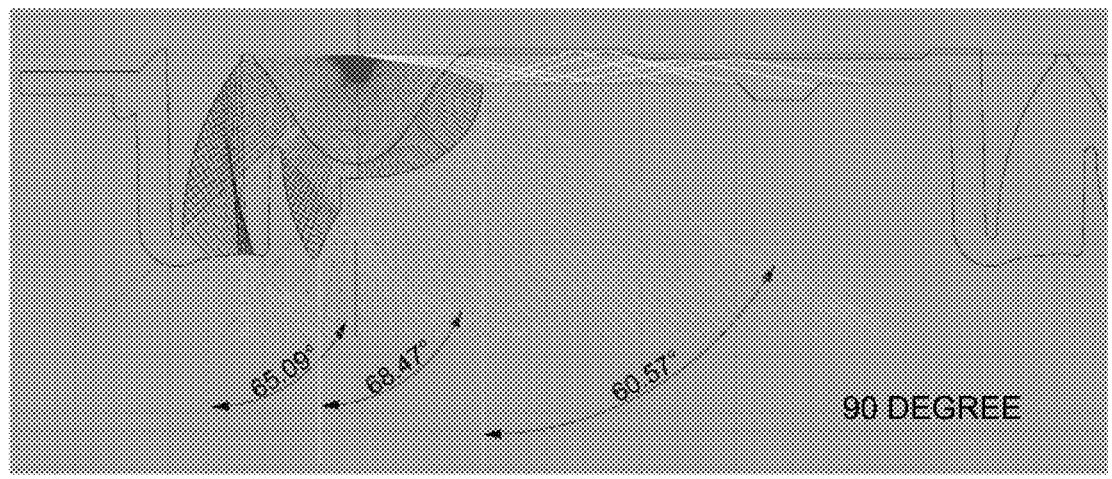

Similar design techniques can be used to develop fixtures if IESNA types 1, 2, and 4 as well. For example, FIG. 25 and FIG. 26 show ray traces of light from one of the LEDs in the "0 degree" and "90 degree" directions respectively of a Type 2 molded optic. The Type 2 molded optic is very similar in overall appearance to the molded optic 1701 as shown in FIGS. 17-19, and is not separately shown. A Type 2 light fixture generally produces a rectangular illumination field that is more elongated than the field produce by a Type 3 fixture.

Figure 27:
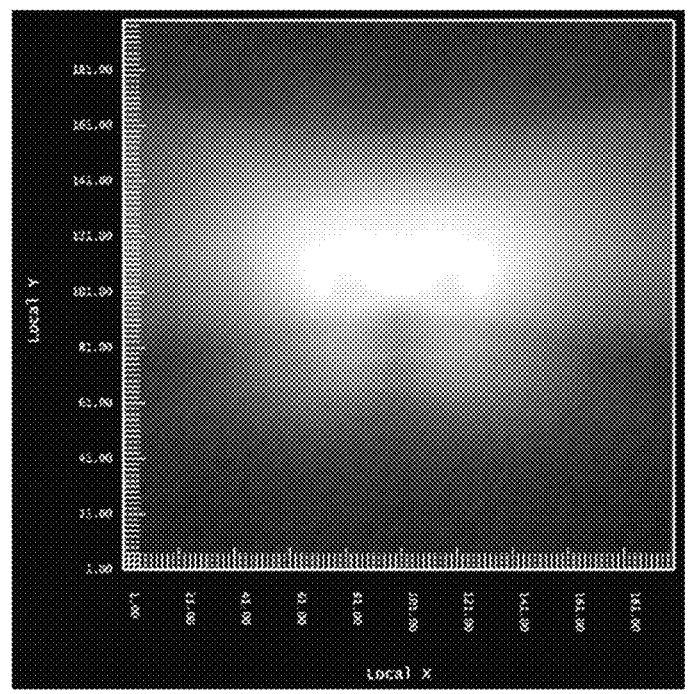
FIG. 27 and FIG. 28 show the distribution of light produced by the Type 2 light fixture of FIGS. 25 and 26.
Figure 28:
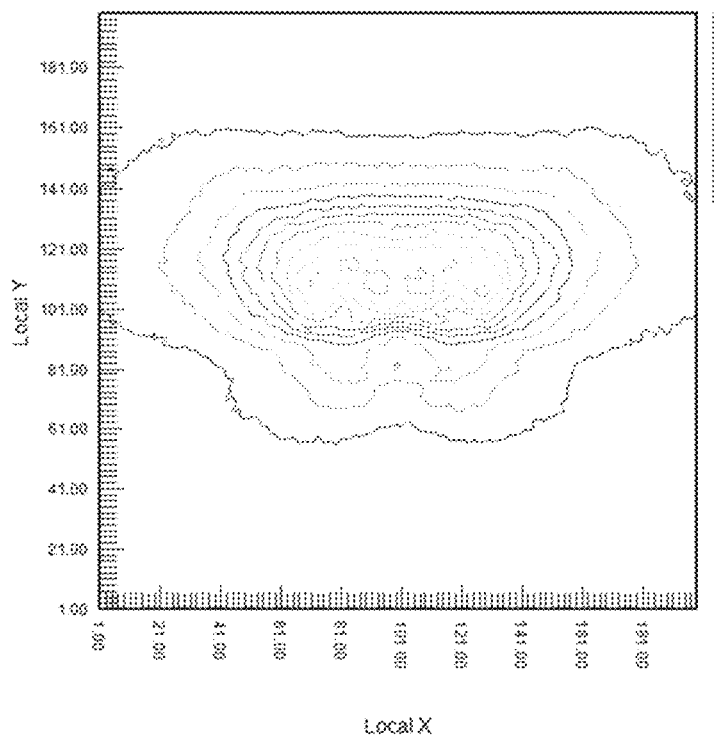

FIG. 27 and FIG. 28 show the light intensity produced by the Type 2 fixture, similar to the way in which FIGS. 23 and 24 show the light intensity produced by the Type 3 fixture using the optic 1701.

Molded optics such as optics 501 and 1701, as well as optics providing different sizes of illumination fields and illumination fields having different aspect ratios, may be interchangeable within a light fixture such as the light fixture 200, so that unusual parking lot shapes may be accommodated by selecting different optics for installation at different locations in the parking lots. Optics and light fixtures according to embodiments of the invention may be used in new installations, or to retrofit existing parking lots for energy reduction.

FIGS. 29-34 illustrate a technique for determining the shapes of the surfaces of an optic embodying the invention, including the concave and convex aspheric optical shapes, in order to achieve a desired light distribution.

Figure 29:
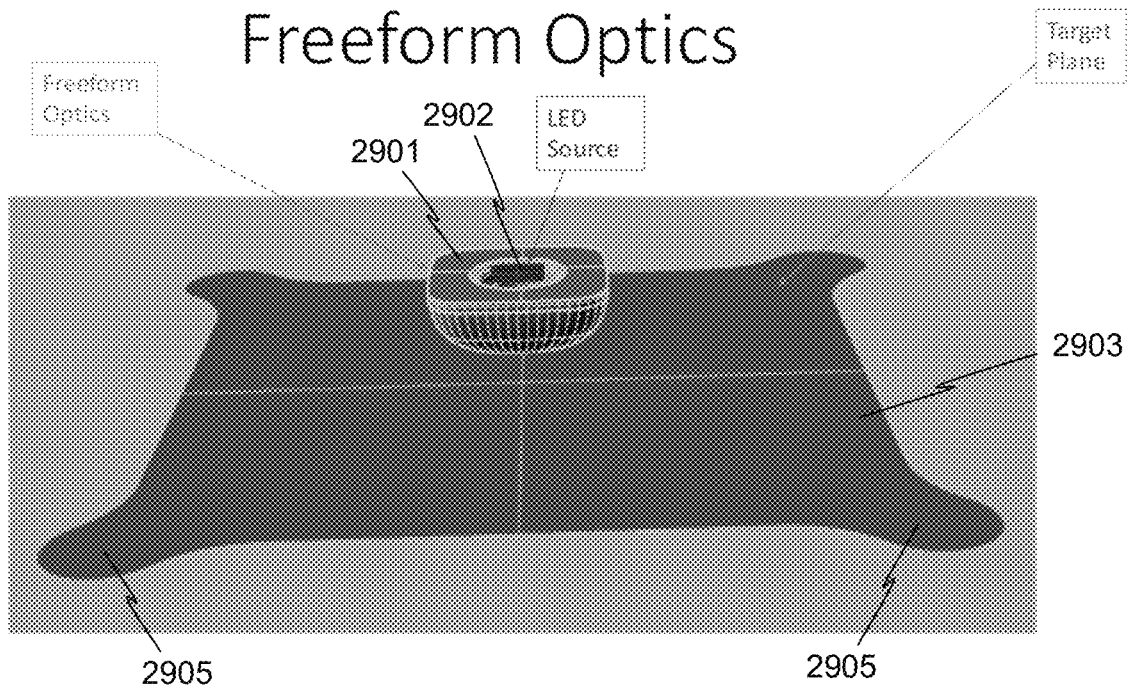

For example, FIG. 29 illustrates an initial setup of parameters for the system. The optic 2901 and LED 2902 are mathematically positioned in space over a target plane 2903. A target distribution 2904 is selected, including lobes 2905. Selecting the target distribution corresponds to step 3401 of FIG. 34.

Figure 30:
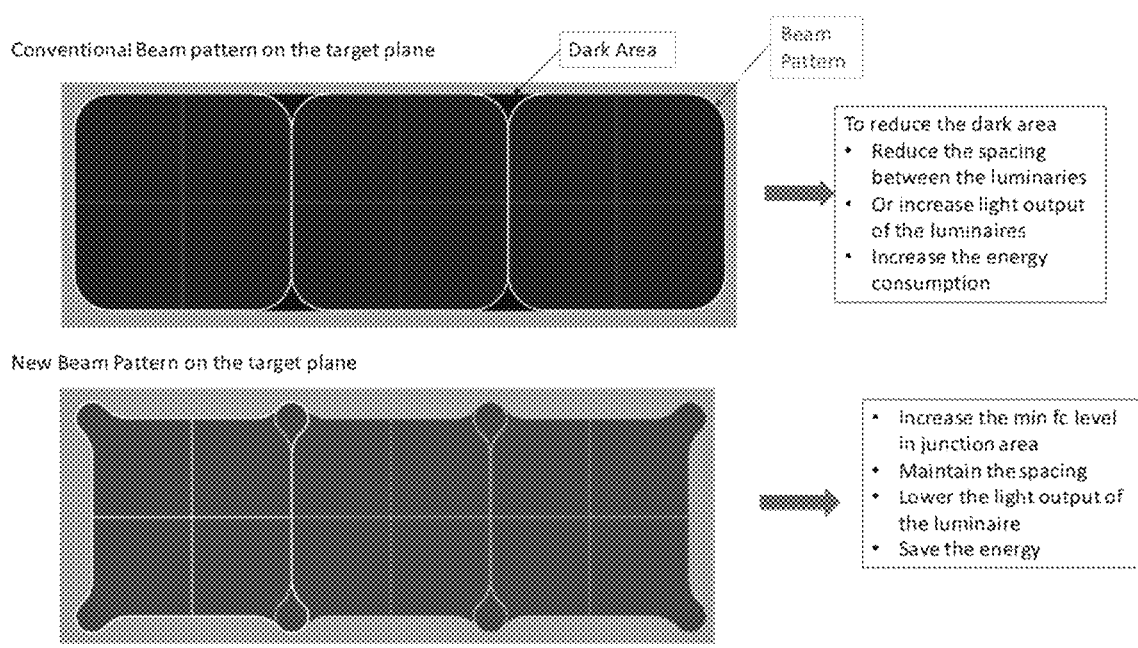

FIG. 30 shows the effect of the lobes 2905 produced by several light fixtures, overlapping to fill interstitial areas, as compared with a conventional beam pattern.

Figure 31:
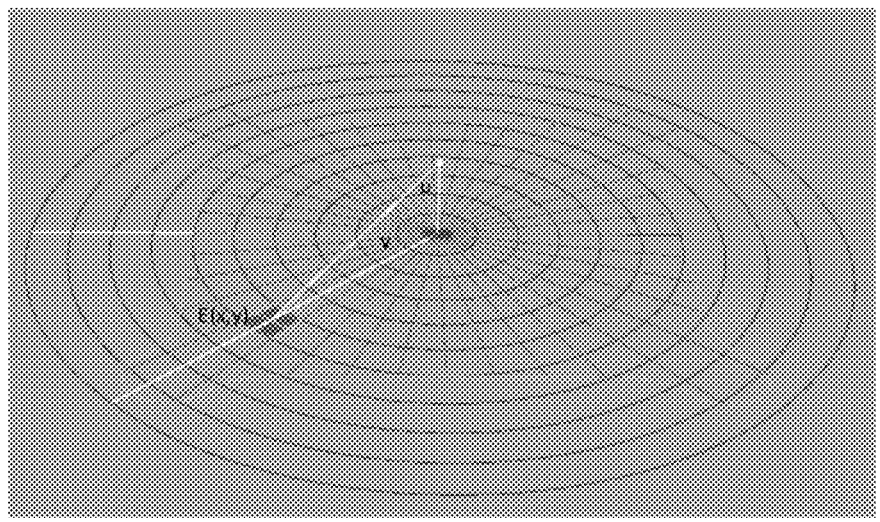

FIG. 31 further illustrates quantitatively creating the target distribution.

Figure 32:
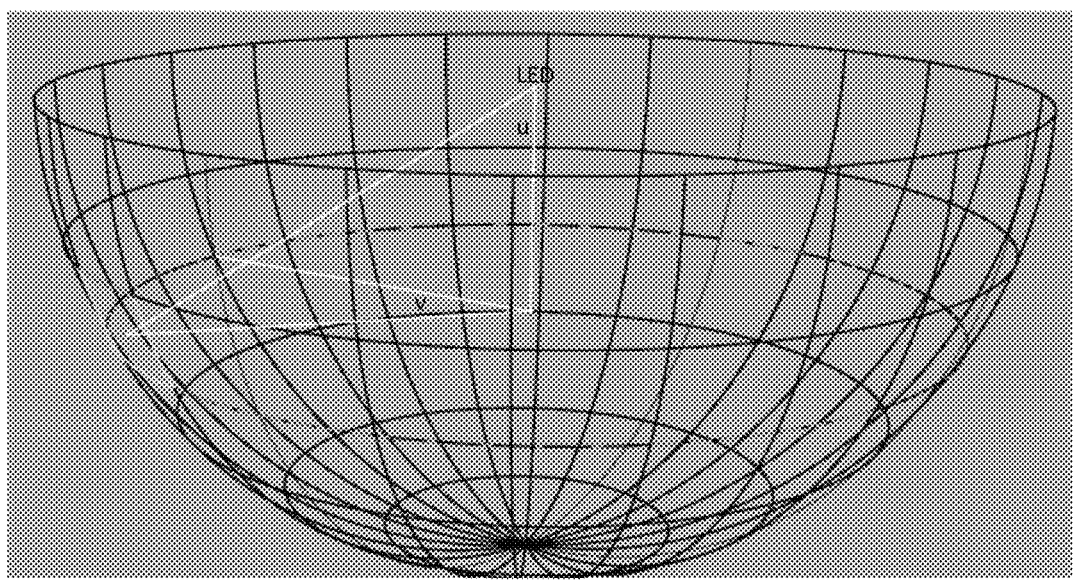
Figure 34:
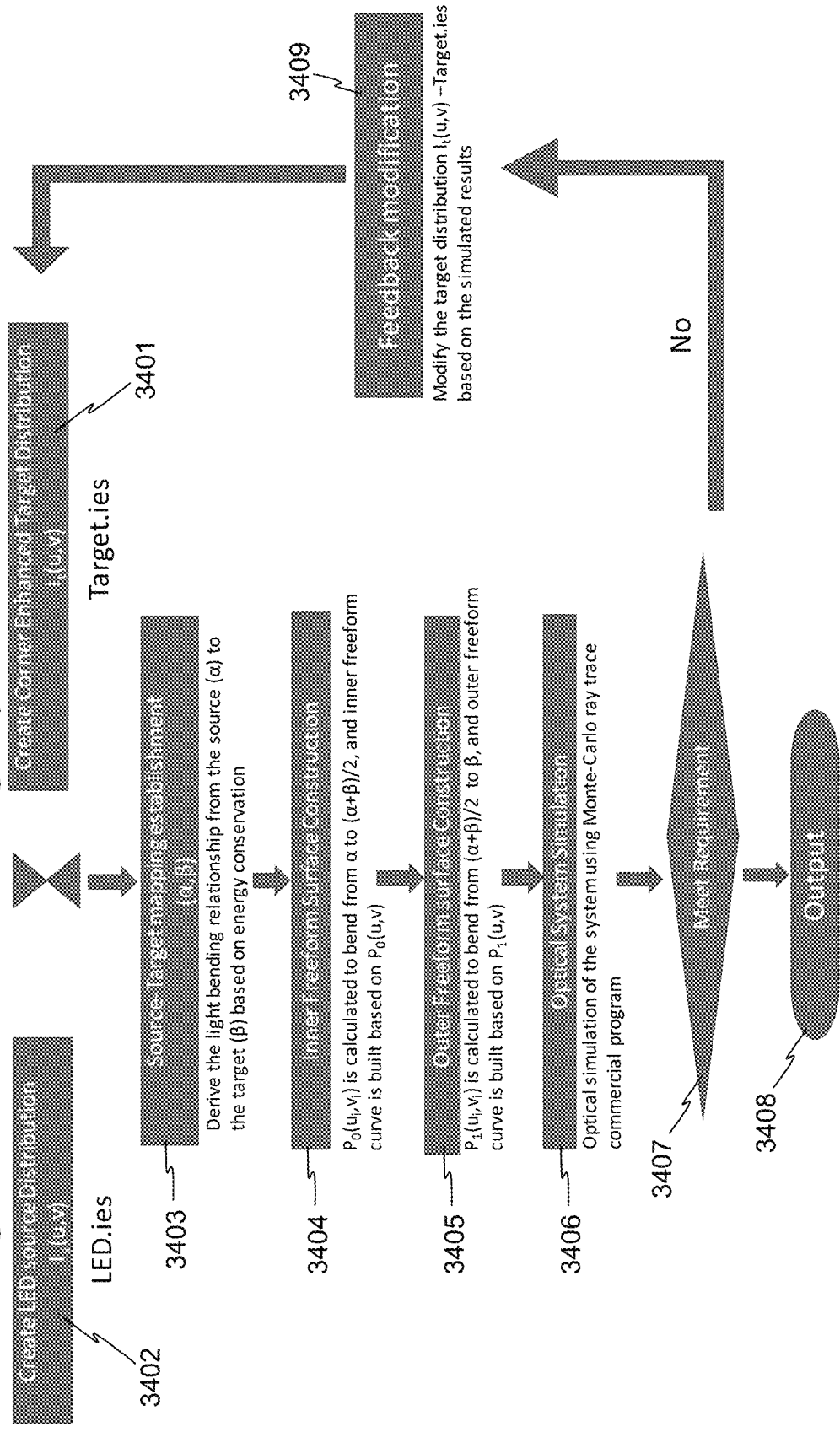

FIG. 32 illustrates a coordinate system for characterizing the distribution of light produced by the LED 2902, corresponding to step 3402 in FIG. 34.

FIG. 33 illustrates additional steps in the design of the optic 2901. Rays from the LED 2902 ($I_s(u,v)$) are mapped to the desired target distribution 2904 ($I_t(u,v)$), to achieve the desired target distribution. This mapping determines how much rays from each portion of the source distribution must be bent in order to arrive at the correct portion of the target plane 2903. Using this information, the inner concave aspheric surface 3301 and the outer convex aspheric surface 3302 are mathematically constructed to create the necessary ray bending. These steps correspond to steps 3404 and 3405 of FIG. 34.

Referring now to FIG. 34, at step 3406 the system is simulated using a Monte-Carlo method, to calculate the distribution of light on the target plane 2903. At step 3407, the simulated distribution is compared with the target distribution. If the simulated and target distributions are sufficiently similar, at least within a pre-specified tolerance, the design of the optic 2901 may be considered complete, and is output at step 3408.

However, if the simulated distribution does not meet the target requirements, the target distribution is adjusted at step 3409, and the other steps are repeated. For example, if the simulation determines that the currently-designed optic 2901 will not sufficiently fill the interstitial areas of the target plane 2903, then the lobes 2905 of the target distribution may be enlarged, so that the design process will shift more light outward toward the lobes 2905 from the inner part of the target distribution.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents. It is to be understood that any workable combination of the features and capabilities disclosed herein is also considered to be disclosed.

What is claimed is:

1. A light fixture for lighting a surface, the light fixture comprising:
   a housing;
   a plurality of light sources; and
   a molded optic through which light from the light sources is directed, the molded optic further comprising:
   a plurality of concave aspheric optical surfaces in a first side of the molded optic, each of the concave aspheric optical surfaces partially enclosing one or more of the plurality of light sources, wherein the aspheric concave optical surfaces receive light directly from the respective enclosed light sources; and a plurality of convex aspheric optical surfaces disposed respectively opposite the plurality of concave aspheric optical surfaces on a second side of the molded optic, opposite the first side;

wherein the light sources, the concave aspheric optical surfaces, and the convex aspheric optical surfaces cooperate to direct light produced by the light sources onto the surface in an illumination field that is generally rectangular;

and wherein the plurality of light sources are arranged in at least two arrays, and the light fixture comprises at least two of the molded optic, one molded optic respectively for each of the arrays of light sources.

2. The light fixture of claim 1, wherein the illumination field has lobes of illumination at the corners extending beyond the boundaries of the otherwise-rectangular field shape.

3. The light fixture of claim 2, wherein the convex optical surfaces are at least partially briquette-shaped, having a rounded profile with extended rounded corners.

4. The light fixture of claim 3, wherein the concave optical surfaces are round in cross-section.

5. The light fixture of claim 1, wherein the light sources comprise light emitting diodes (LEDs).

6. The light fixture of claim 1, wherein each of the concave aspheric optical surfaces at least partially encloses at least two of the light sources.

7. The light fixture of claim 1, wherein the molded optic further comprises a molded prismatic feature that intersects at least two of the convex aspheric optical surfaces, and that redirects light from at least some of the light sources by total internal reflection.

8. The light fixture of claim 1, wherein the light sources, the concave aspheric optical surfaces, and the convex aspheric optical surfaces cooperate to direct light produced by the light sources onto the surface in an illumination field that is generally square but has lobes of illumination at the corners extending beyond the boundaries of the otherwise-square field shape.

9. The light fixture of claim 1, wherein the light from each of the light sources is directed into an illumination field that is substantially symmetrical about an optical axis of the light source.

10. The light fixture of claim 1, wherein the light from each of the light sources is directed into an illumination field that is asymmetrical about an optical axis of the light source.

11. A light fixture for lighting a surface, the light fixture comprising:
a housing;
a plurality of light sources; and
a molded optic through which light from the light sources is directed, the molded optic further comprising:
a plurality of concave aspheric optical surfaces in a first side of the molded optic, each of the concave aspheric optical surfaces partially enclosing one or more of the plurality of light sources, wherein the aspheric concave optical surfaces receive light directly from the respective enclosed light sources; and a plurality of convex aspheric optical surfaces disposed respectively opposite the plurality of concave aspheric optical surfaces on a second side of the molded optic, opposite the first side;

wherein the light sources, the concave aspheric optical surfaces, and the convex aspheric optical surfaces cooperate to direct light produced by the light sources onto the surface in an illumination field that is generally rectangular;

and wherein the molded optic comprises a textured surface on the second side of the molded optic, between at least some of the convex aspheric optical surfaces.

12. A light fixture for lighting a surface, the light fixture comprising:
a housing;
a plurality of light sources; and
a molded optic through which light from the light sources is directed, the molded optic further comprising:
a plurality of concave aspheric optical surfaces in a first side of the molded optic, each of the concave aspheric optical surfaces partially enclosing one or more of the plurality of light sources, wherein the aspheric concave optical surfaces receive light directly from the respective enclosed light sources; and a plurality of convex aspheric optical surfaces disposed respectively opposite the plurality of concave aspheric optical surfaces on a second side of the molded optic, opposite the first side;

wherein the light sources, the concave aspheric optical surfaces, and the convex aspheric optical surfaces cooperate to direct light produced by the light sources onto the surface in an illumination field that is generally rectangular;

and wherein the molded optic comprises a smooth surface of the first side of the molded optic, between at least some of the concave aspheric optical surfaces, wherein the smooth surface is smooth enough that light encountering the smooth surface reflects from the smooth surface by total internal reflection.

13. A molded optic, comprising:
a plurality of concave aspheric optical surfaces in a first side of the molded optic;
a plurality of convex aspheric optical surfaces disposed respectively opposite the plurality of concave aspheric optical surfaces on a second side of the molded optic, opposite the first side, wherein the convex optical surfaces are at least partially briquette-shaped, having a rounded profile with extended rounded corners; and
a smooth surface on the first side of the molded optic, between at least some of the concave aspheric optical surfaces, wherein the smooth surface is smooth enough that light encountering the smooth surface reflects from the smooth surface by total internal reflection;
wherein each of the concave aspheric optical surfaces cooperates with its respective convex aspheric optical surface to direct light produced by a light source at least partially enclosed by the concave aspheric optical surface onto a surface in an illumination field that is generally rectangular but has lobes of illumination at the corners extending beyond the boundaries of the otherwise-rectangular field shape.

14. A molded optic, comprising:
a plurality of concave aspheric optical surfaces in a first side of the molded optic;
a plurality of convex aspheric optical surfaces disposed respectively opposite the plurality of concave aspheric optical surfaces on a second side of the molded optic, opposite the first side, wherein the convex optical surfaces are at least partially briquette-shaped, having a rounded profile with extended rounded corners; and a textured surface on the second side of the molded optic, between at least some of the convex aspheric optical surfaces;

wherein each of the concave aspheric optical surfaces cooperates with its respective convex aspheric optical surface to direct light produced by a light source at least partially enclosed by the concave aspheric optical surface onto a surface in an illumination field that is generally rectangular but has lobes of illumination at the corners extending beyond the boundaries of the otherwise-rectangular field shape.

15. The molded optic of claim 13, wherein the molded optic is a monolithic piece of optical material.

16. The molded optic of claim 13, wherein the molded optic is configured to direct the light produced by the light source into an illumination field that is substantially symmetrical about an optical axis of the light source.

17. The molded optic of claim 13, wherein the molded optic is configured to direct the light produced by the light source into an illumination field that is asymmetrical about an optical axis of the light source.

18. The molded optic of claim 13, wherein at least one of the convex aspherical optical surfaces is at least partially textured.

19. The molded optic of claim 14, wherein the molded optic is configured to direct the light produced by the light source into an illumination field that is asymmetrical about an optical axis of the light source.

20. The molded optic of claim 14, wherein at least one of the convex aspherical optical surfaces is at least partially textured.

* * * * *